Sept. 14, 1948. W. J. O'BRIEN 2,449,174
ANTENNA SUPPLY PHASE AND AMPLITUDE CONTROL
Filed April 13, 1942 2 Sheets-Sheet 1

WILLIAM J. O'BRIEN,
INVENTOR

BY
Harold W. Mattingly
ATTORNEY.

Sept. 14, 1948.   W. J. O'BRIEN   2,449,174
ANTENNA SUPPLY PHASE AND AMPLITUDE CONTROL
Filed April 13, 1942   2 Sheets-Sheet 2
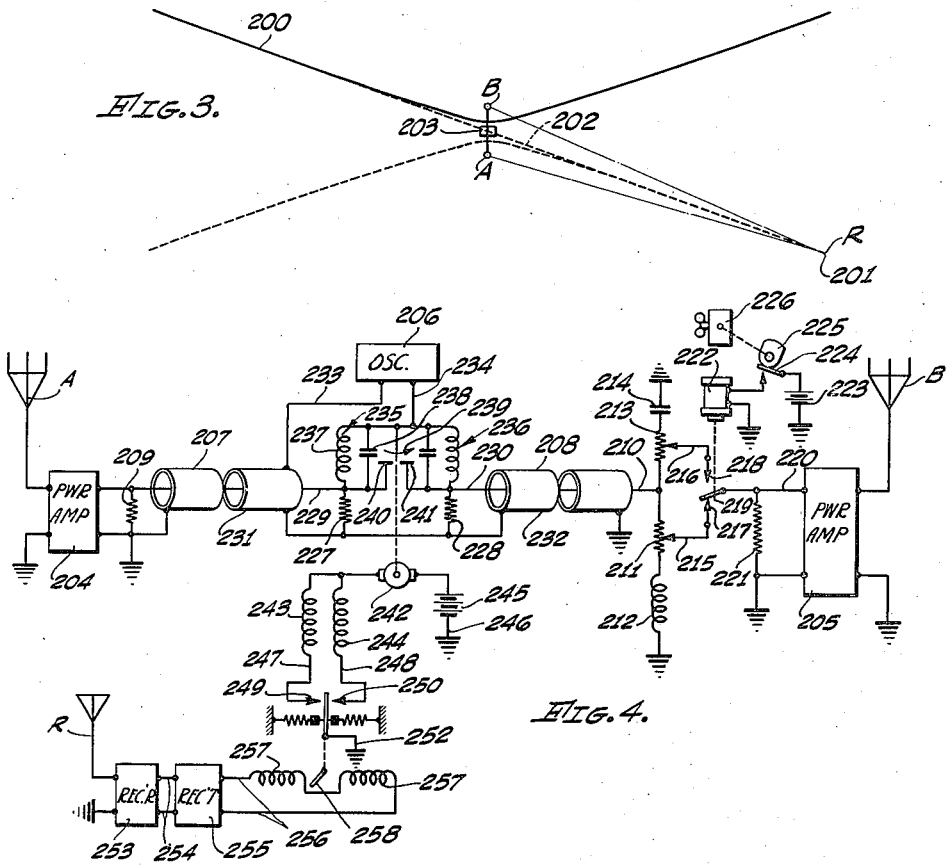
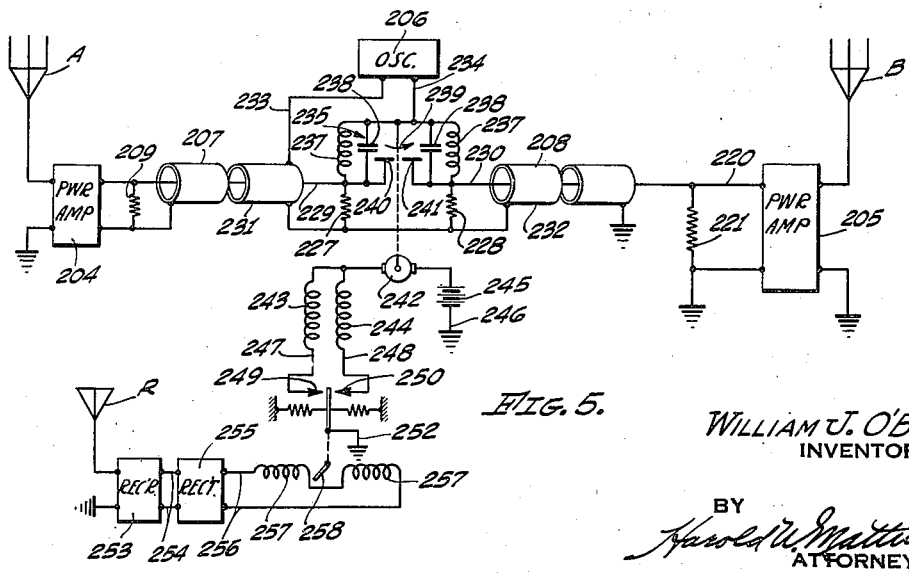
WILLIAM J. O'BRIEN,
INVENTOR Patented Sept. 14, 1948

2,449,174

UNITED STATES PATENT OFFICE 2,449,174

ANTENNA SUPPLY PHASE AND AMPLITUDE CONTROL

William J. O'Brien, Los Angeles, Calif., assignor to The Decca Record Company, Limited, London, England, a corporation of Great Britain Application April 13, 1942, Serial No. 438,712

7 Claims. (Cl. 250—17)

1

My invention relates to a radio frequency transmission system and has particular reference to a radio frequency transmission system particularly adapted for use in connection with radio beacon systems such as are employed as an aid in the navigation of aircraft or other mobile vehicles.

The radio beacon systems which are in current use today are of the type referred to as the equi-signal type. These systems employ a plurality of spaced radio frequency transmitting antennae which are so excited as to produce in space an equi-potential electrical surface, which surface is used as an aid to the navigation of aircraft. Such a system serves to define a course extended toward a desired objective or destination, which course comprises the locus of all points at which the intensity of the signals received from each of the plurality of radio frequency transmitting antennae is equal. The signals are normally rendered distinguishable either by modulating each of the pair of signals at different audible frequencies or by distinguishably keying the transmitting antennae. The "on course" position of a vehicle is indicated by the reception of equal signals, whereas, the "off course" location of the vehicle is indicated by the reception of signals in which one signal predominates over the other.

Considerable difficulty has been experienced in the use and operation of the equi-signal type of radio beacon system resulting from a tendency of the so-called "beam" or "on course" line defined by the system to wander or oscillate from side to side through a considerable angle. The causes of the number of commercial airline crashes in the past have been directly traced to the wandering or wavering of the beacon "beam." Investigation has shown that this wavering or wandering of the beam is produced by changes in the relative phase of the two radio frequency signals employed to produce the guiding surface. It has been found that a relatively slight shift in phase of one signal with respect to the other will produce a substantial shift in the compass direction of the course defined by the system.

The causes of the phase changes which produce this wavering of the beam are principally changes in the transmitting antenna characteristics. Among the characteristics which have been found to be variable are the length of the antenna proper. It has been found that the actual physical length of the antenna will change as a result of changes in temperature and that there is also produced a still further change in the effective electrical length of the antenna due to changes occurring in the electrical circuits and also due

2 to a change in the level of the electrical ground plane due to varying weather conditions, it being realized that the electrical ground plane does not necessarily coincide with the ground surface but usually lies some distance below the actual surface of the ground.

It has also been found that the resistance of the antenna changes from time to time as a result of variations of the di-electric constant of the air which is in turn variable with the variable weather conditions. Likewise the resistance of the antenna circuit varies with changes in ground resistance resulting from changing moisture content and changing salt content. Apparent changes in the length and resistance of the antenna may also result from actual physical movement of the antenna as occurs, for example, during a storm.

In my copending application Serial No. 420,059, filed November 22, 1941, now abandoned, and entitled "Radio beacon system," I have described and claimed a new and different type of radio beacon system which differs from the conventional equi-signal system in that signals of different but harmonically related frequencies are continually radiated and the course which is defined by the system is the locus of points of a selected fixed multiple phase relation between the two sets of radio frequency signals. This system is, of course, also sensitive to changes in the relative phase of the signals emanated from the transmitting antennae and while the system disclosed in my above-identified application is capable of providing an extremely high sensitivity and accuracy of course indication, this accuracy is nevertheless dependent, like that of the equi-signal type of systems, upon maintaining a constant phase relation between the various sets of signals emanated from the radio beacon transmission antennae.

It is, therefore, an object of my invention to provide a novel radio frequency transmission system which includes a control mechanism for maintaining fixed the phase of the transmitted signals.

It is also an object of my invention to provide a system of the character set forth in the preceding paragraphs which includes a means for maintaining the antenna current constant irrespective of changes in the antenna characteristics.

It is an additional object of my invention to provide a system of the character set forth in the preceding paragraphs which includes a means responsive to changes in radio frequency voltage and antenna current for adjusting the resistance of the antenna circuit to compensate for changes in antenna resistance caused by extraneous circumstances.

It is also an object of my invention to provide a radio transmission system of the character set forth hereinbefore which includes a means responsive to the power factor of the radio frequency voltage and antenna current for adjusting the inductance of the antenna circuit to compensate for changes in the reactance of the antenna resulting from changing extraneous circumstances.

It is additionally an object of my invention to provide a radio beacon system employing spaced radio transmission antennae for defining a vehicle guiding course which includes a radio frequency receiver positioned along said course and coupled to actuate control mechanism associated with said radio transmission antennae to so compensate for phase changes produced by varying extrinsic circumstances as to maintain fixed the compass direction of said vehicle guiding course.

Other objects and advantages of my invention will be apparent from a study of the following specifications, read in connection with the accompanying drawings, wherein:

Fig. 3 is a diagrammatic plan view illustrating a type of radio beacon transmitting system and showing the location of a control receiver employed to control the operation of the beacon transmitters;

Figures 1, 2:
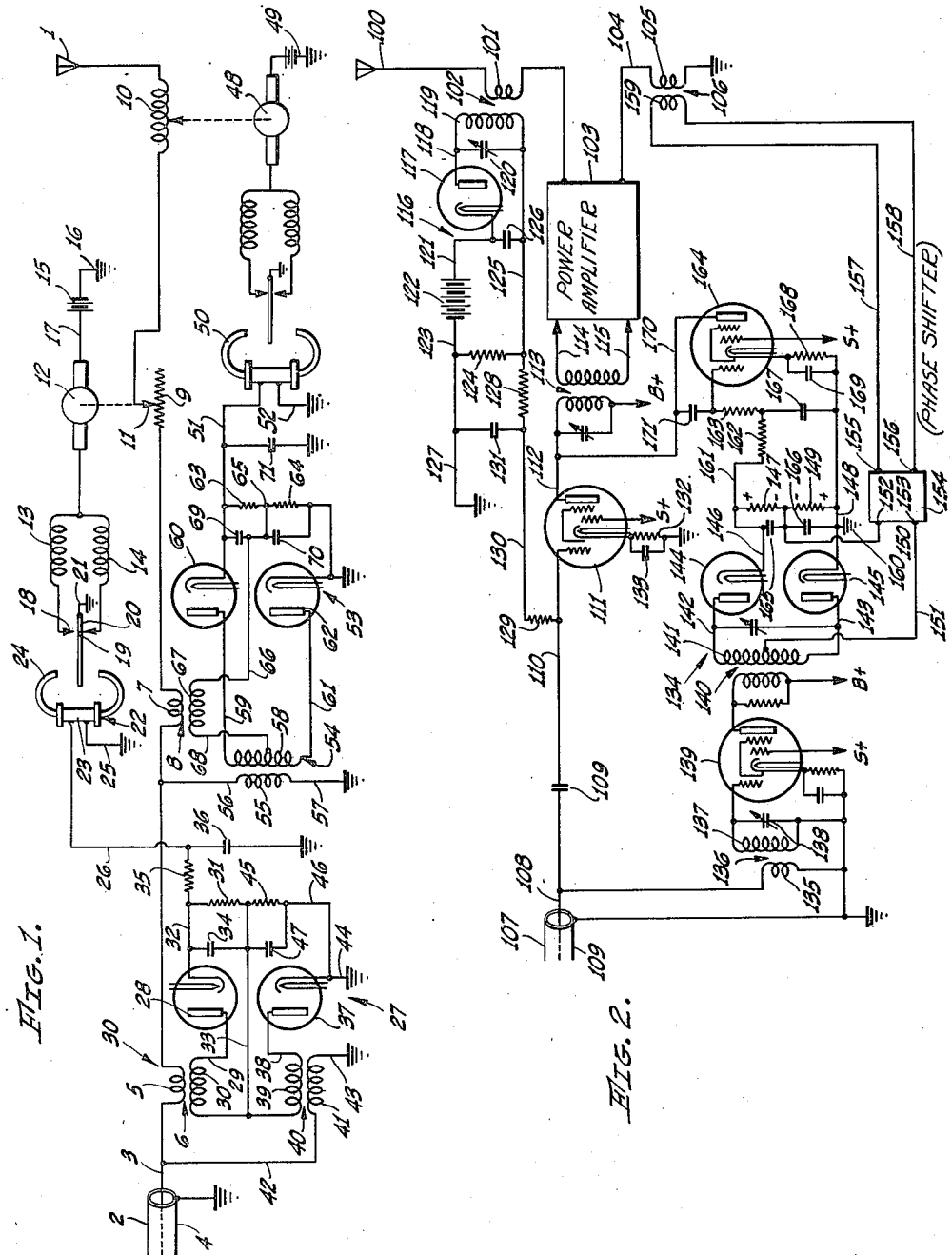
Fig. 1 is a wiring diagram illustrating schematically one embodiment of my invention as directed to providing a means for changing the electrical constants of an antenna circuit to compensate for electrical and physical changes in such circuit and maintain a constant antenna characteristic.
Fig. 2 is a schematic wiring diagram similar to Fig. 1 but illustrating an alternative form of my invention.

Fig. 4 is a wiring diagram illustrating schematically a radio beacon system of the equi-signal type and the manner in which the control receiver illustrated in Fig. 3 is connected to control the radio beacon transmitting system to thereby maintain a substantially constant compass direction of defined course; and Fig. 5 is a wiring diagram similar to Fig. 4 but illustrating the manner in which the control receiver is used to control a radio beacon system of the equi-phase difference type.

Referring to the drawings, I have illustrated in Fig. 1 a radio frequency transmitting antenna 1 as being connected to receive power from a suitable radio transmission line 2 illustrated in Fig. 1 as comprising a coaxial cable including a central conductor 3 surrounded by and insulated from a grounded metallic sheath 4. The transmission line 2 is, of course, connected to be supplied with power from any suitable type of radio transmitting apparatus.

The conductor 3 is connected to feed the antenna 1 by a circuit which includes in series relationship a primary winding 5 of a current transformer 6, a primary winding 7 of a second current transformer 8, a variable resistance 9 and a variable inductance 10.

The variable resistance 9 includes a movable arm portion 11 coupled to be moved along the resistance element 9 as, for example, by means of an electric motor 12 to insert resistance into the antenna circuit or to remove resistance from the antenna circuit depending upon the direction of rotation of the motor 12.

The motor 12 may be of any suitable reversible type and is illustrated in Fig. 1 as comprising a split series field type of universal motor including field windings 13 and 14 so arranged that if power is supplied to the motor 12 through the field 13, the motor will be rotated in one direction, whereas, if power is supplied to the motor through the field 14 the motor will be rotated in the opposite direction. Power for operating the motor 12 may be obtained from any suitable source indicated in Fig. 1 as comprising a battery 15, one terminal of which is grounded as at 16 and the other terminal of which is connected to one of the motor terminals as by means of a conductor 17.

The free ends of the field windings 13 and 14 are each connected to contacts 18 and 19 of a double-throw relay contact arrangement, the movable element 20 of which is grounded as at 21. Thus movement of the movable element 20 to engage the contact 18 will result in rotating the motor 12 in one direction, whereas, an opposite movement of the element 20 will result in the reversing of the direction of motor rotation.

The movable element 20 preferably comprises the armature of a polarized relay which is indicated generally at 22 and which includes an electrical coil 23. The coil 23 and the magnetic structure of the relay indicated diagrammatically at 23 is so arranged that a minute current flowing through the coil in one direction will cause the movable element of the relay to be moved in a given direction, whereas, the flow of a small current through the coil 23 in a reverse direction will result in the movable element 20 being likewise moved in an opposite direction. The element 20 is so arranged that it will occupy an intermediate position with the contacts 18 and 19 both open whenever no current is flowing through the coil 23.

The coil 23 preferably has one terminal grounded as indicated at 25 and the other terminal is connected as by means of a conductor 26 to control mechanism illustrated generally at 27 and responsive to changes in the resistance of the antenna circuit to produce a control voltage on the conductor 26 with respect to ground of such polarity as to actuate the relay 22 and place the motor 12 in operation in such direction as to vary the variable antenna resistance 9 in a direction such as to compensate for the change in antenna resistance originally producing the control voltage on the conductor 26.

The control mechanism 27 includes a rectifier 28, the anode of which is connected as by means of a conductor 29 to a secondary winding 30 of the current transformer 6. The cathode of the rectifier 28 is connected to the other terminal of the secondary winding 30 through a load resistance 31 as by means of conductors 32 and 33. The radio frequency component of the current flowing in the conductors 32 and 33 is preferably shunted past the resistance 31 as by means of a condenser 34 connected in parallel therewith. The conductor 32 is likewise preferably connected to the conductor 26 through a resistance 35 and any stray radio frequency voltages which may thus be applied to the conductor 26 are preferably returned to ground as by means of a condenser 36 connected between the conductor 26 and ground.

The current transformer 6 and the rectifier 28 thus operate to produce across the resistance 31 a direct potential which is directly proportional to the magnitude of the radio frequency current flowing in the antenna feeding circuit through the current transformer primary winding 5. It will be noted that such direct potential as is produced across the resistance 31 will cause the conductor 32 to be positive with respect to the conductor 33.

The control mechanism 27 also includes a second rectifier 37, the anode of which is connected as by means of a conductor 38 to a secondary winding 39 of a potential transformer 40. The potential transformer 40 includes a primary winding 41 which is connected in shunt relation across the antenna feeder circuit, one terminal of the primary 41 being connected to the antenna conductor 3 as by means of a conductor 42 and the other terminal of the primary winding 41 being grounded as at 43. The cathode of the rectifier 37 is preferably grounded as at 44 and connected to the other end of the transformer secondary winding 39 through a load resistance 45 as by means of conductors 46 and 33, the cathode ends of the windings 30 and 39 being interconnected and both being connected to the conductor 33 as is illustrated in Fig. 1.

The radio frequency component of the rectifier current flowing in the circuit 33—46 is preferably shunted around the load resistance 45 by means of a by-pass condenser 47 connected in parallel therewith.

It will be noted that the rectifier 37 operates to produce across the resistance 45 a direct potential which is exactly proportional to the voltage of the antenna feeding conductor 3 with respect to ground and that the polarity of such voltage is such that the conductor 46 is positive with respect to the conductor 33. Thus the direct potential which may be applied to the conductor 26 with respect to ground is equal to the difference in direct potentials produced across the resistances 31 and 45.

It will also be appreciated that any change in the resistance of the antenna circuit will result in a change in both the antenna current and the voltage of the antenna feeding conductor 3 with respect to ground. Furthermore, such voltage and current changes will be in the opposite direction; that is, an increase in antenna resistance will tend to reduce the antenna current and at the same time tend to increase the voltage of the conductor 3 with respect to ground.

The resistances 31 and 45 are preferably so adjusted that the voltages thereacross are equal when the resistance of the antenna circuit is adjusted to the desired value. Consequently, a subsequent change in antenna resistance as, for example, a reduction in antenna resistance, will result in the application of a positive direct potential to the conductor 26. This will cause current to flow through the relay coil 23 in one direction and so energize the motor 12 as to insert resistance in the antenna circuit by means of the variable resistance 9 to thereby compensate for the reduction in antenna resistance due to other extraneous causes.

Similarly, if the antenna resistance were to increase, the voltage produced on the conductor 26 would be negative with respect to ground and current would flow through the relay coil 23 in the opposite direction so as to oppositely energize the motor 12 and result in resistance being removed from the antenna circuit at the variable resistance 9. Thus, the control mechanism 27 co- acting with the relay 22, the motor 12 and the variable antenna resistance 9 operates to maintain the resistance of the antenna circuit constant irrespective of any other electric changes or physical changes tending to change the net electrical resistance of the antenna circuit.

In a similar manner I have arranged for the control of the variable inductance 10 in such manner as to maintain the inductance or inductive reactance of the antenna constant irrespective of physical changes tending to shift the reactance of antenna circuit from the desired operating value. The variable inductance 10 is, therefore, arranged to be varied by the rotation of a reversible electric motor 48 which is connected to a suitable source of power 49 and arranged to be controlled in its direction of rotation by a polarized relay 50, the motor 48 and relay 50 being connected in a manner identical to that previously described in connection with the motor 12 and relay 22.

The control voltage for operating the polarized relay 50 is obtained from a conductor 51 which is connected to one terminal of the coil of the relay 50, the other terminal thereof being grounded as at 52. The control voltage is supplied to the conductor 51 by means of a control mechanism indicated generally in Fig. 1 by the reference character 53. This mechanism may include a potential transformer 54 including a primary winding 55 connected across the antenna feeding circuit as by connecting one terminal thereof to the antenna feeding conductor as by means of a conductor 56 and by connecting the other terminal thereof to ground as by means of a conductor 57.

The potential transformer 54 includes a secondary winding 58, one terminal of which is connected as by means of a conductor 59 to the anode of a rectifier 60 and the other terminal of which is connected as by means of a conductor 61 to the anode of a rectifier 62. The cathode of the rectifier 60 is connected to the conductor 51 and is also interconnected with the cathode of the rectifier 62 through a pair of series connected resistances 63 and 64. The point of interconnection 65 common to both of the resistances 63 and 64 is extended by means of a conductor 66 into connection with a secondary winding 67 of the current transformer 8, the other terminal of the winding 67 being connected as by means of a conductor 68 to a mid-tap provided on the potential transformer secondary winding 58.

The radio frequency components of the rectified currents flowing through the rectifiers 60 and 62 are shunted around the resistances 63 and 64 by means of by-pass condensers 69 and 70 and any stray radio frequency voltages appearing on the conductor 51 are preferably by-passed to ground by means of a condenser 71.

The above described circuit operates to apply across the rectifier 60 a voltage which is equal to the vector sum of the voltage induced in the current transformer winding 67 (directly proportional to the magnitude of the current flowing in the antenna circuit) and one-half of the voltage induced in the potential transformer secondary winding 58. There is also applied across the rectifier 62 a voltage which is equal to the vector sum of the voltage induced in the current transformer secondary winding 67 and one-half of the voltage induced in the potential transformer secondary winding 58, this latter voltage being, however, 180° out of phase with respect to the corresponding voltage applied to the rectifier 60. The phase of voltage across the winding 67 should normally be in phase quadrature to that across winding 58. A slight deviation in phase may be compensated by adjusting the mid-tap portion of winding 58.

As a result of this arrangement, the ratio of the voltages which are applied to the rectifiers 60 and 62 are independent of the actual magnitude of the current flowing in the antenna circuit and are also independent of the actual magnitude of the voltage of the antenna conductor with respect to ground. However, any changes in the phase relation between the antenna voltage and the antenna current will result in a change in the ratio of the voltages applied to the rectifiers 60 and 62.

The various circuit constants of the above described circuit and also the resistances 63 and 64 are so adjusted that the voltage produced across the resistance 63 is equal to the voltage produced across the resistance 64 when the antenna 1 is operating at the desired power factor; that is, when the antenna exhibits the desired inductive reactance. The current flow through the resistances 63 and 64 are in opposite directions so that the voltage of the conductor 51 with respect to ground is equal to the difference between the voltages produced across the resistances 63 and 64. Thus, when the antenna 1 exhibits the desired inductive reactance, no voltage will be applied to the conductor 51 and the relay 50 will maintain a neutral position so as to keep the control motor 48 de-energized.

If, however, the reactance of the antenna changes as a result, for example, of a change in actual length of the antenna, there will be produced on the conductor 51 a corresponding voltage. This will cause the motor 48 to be energized to rotate in such direction as to vary the variable inductance 10 in a direction opposite to the change in inductive reactance of the antenna and thus restore the inductive reactance of the antenna circuit to the desired value.

It will thus be noted that the variable resistance 9, together with its control and operating mechanism, and the variable inductance 10 cooperate with each other to maintain the electrical characteristic of the antenna 1 absolutely constant irrespective of other electrical or extraneous physical changes tending to normally vary the antenna operating conditions from their desired values.

I have illustrated in Fig. 2 a modified form of control apparatus intended to accomplish the same ultimate result of maintaining the antenna operating conditions substantially constant. I have, therefore, illustrated in Fig. 2 an antenna 100 as being connected through a primary winding 101 of a current transformer 102 to the output of a suitable radio frequency power amplifier represented diagrammatically by the rectangle 103, it being understood that the radio frequency power amplifier thus represented may be of any suitable or conventional construction. The other output terminal of the amplifier 103 is connected to ground by means of a conductor 104 through a primary winding 105 of a current transformer 106.

The radio frequency amplifier 103 is arranged to be excited by a suitable source of radio frequency voltage conveyed to the location of the amplifier 103 by means of a suitable transmission line 107 illustrated in Fig. 2 as comprising a coaxial cable including a central conductor 108 and closed within and insulated from a grounded metallic sheath 109. The transmission line 107 is understood to be connected to a suitable source of radio frequency voltage (not shown), which source may be of any suitable or conventional construction.

The conductor 108 is coupled by means of a blocking condenser 109 and conductor 110 to the grid of a gain controlled amplifying tube 111, the output of which is connected as by means of a conductor 112 to a coupling transformer 113. The coupling transformer 113 is connected by means of conductors 114 and 115 to the input of the power amplifier 103.

The system which is illustrated in Fig. 2 includes a current regulating means for maintaining the current flowing in the antenna 100 at a substantially constant value irrespective of extraneous changes tending normally to cause a variation in the antenna current. This regulating equipment is indicated in Fig. 2 generally by the reference character 116 and includes a rectifier 117, the anode of which is connected by means of a conductor 118 to a secondary winding 119 of the current transformer 102. The secondary winding 119 is preferably tuned as by a variable condenser 120 to the frequency of the current flowing in the antenna 100.

The cathode of the rectifier 117 is connected to the other terminal of the secondary winding 119 by means of a series circuit including a conductor 121, a bias battery 122, conductor 123, a load resistance 124, and conductor 125. The radio frequency component of the current flowing in the above described series circuit may be shunted around the battery 122 and the load resistance 124 by means of a condenser 126 connected between the conductors 121 and 125.

The polarity of the battery 122 is arranged to apply a positive potential to the cathode of the rectifier 117 relative to the anode thereof so that the rectifier 117 will not be operative until the peak voltage of the radio frequency induced in the secondary winding 119 exceeds the direct bias potential applied by the battery 122. When this potential is exceeded, a direct current will flow through the load resistance 124 to produce a direct potential drop thereacross in such direction as to make the voltage of the conductor 125 negative with respect to the conductor 123.

The conductor 123 is preferably grounded as indicated at 127 so that the potential of the conductor 125 is forced further negative with respect to ground with increases in current in the antenna circuit. The negative voltage applied to the conductor 125 is preferably conveyed through coupling resistances 128 and 129 and a conductor 130 to the grid of the amplifying tube 111. The point of common connection between the resistances 128 and 129 is preferably connected to ground through a by-pass condenser 131. This by-pass condenser coacts with the coupling resistances 128 and 129 to prevent any of the radio frequency voltages induced in the secondary 119 from being applied to the grid of the amplifying tube 111. The cathode of the tube 111 is connected to ground through a cathode resistance 132 preferably by-passed as by means of a condenser 133.

The resistance 132 acts to maintain a substantially fixed direct potential on the cathode of the tube which is positive with respect to ground. The grid of the tube 111 is normally maintained at ground potential by reason of its connection to ground through the resistances 124, 128 and 129 and conductors 127 and 130.

When the grid of the tube 111 is at ground potential, the amplification of the tube 111 is at its maximum value so that there is applied to the input of the power amplifier 103 a maximum exciting potential. This is ordinarily adjusted to produce an output antenna current which exceeds the intended operating antenna current. This excess current will result in operation of the rectifier 117 and the production of a control voltage across the load resistance 124 causing the conductor 125 to bear a negative potential with respect to ground.

This negative potential is applied to the grid of the tube 11 through the resistances 128 and 129 and conductor 130 so as to increase the negative grid bias of the amplifying tube 111 and so reduce the amplification thereof. This in turn reduces the magnitude of the exciting voltage for the power amplifier 103 and tends to reduce the antenna current.

This system will thus establish a normal operating condition in which the grid of the tube 111 is maintained at a potential somewhat negative with respect to ground. Thus, if for any reason the current in the antenna 100 increases, the negative bias on the tube 111 will likewise increase to reduce the amplification of the tube and reduce the exciting voltage applied to the amplifier 103 so as to thus reduce the current flowing in the antenna 100 back to the original intended value.

The operation in case of a decrease in antenna current is, of course, the reverse. Such a decrease will result in the grid of the amplifying tube 111 being shifted less negative with respect to ground to thereby increase its amplification and increase the exciting voltage applied to the power amplifier 103 so as to tend to increase the current flowing in the antenna 100 to its original intended value.

Since the regulating equipment 116 operates to maintain a substantially constant antenna current, the equivalent resistance and inductive reactance of the antenna circuit may be maintained constant by maintaining a fixed phase relation between the current flowing in the antenna and the exciting voltage which is applied to the grid of the amplifying tube 111.

I have illustrated in Fig. 2 generally by the reference character 134 a form of control apparatus which is capable of maintaining this desired phase relation. Generally speaking this mechanism includes a means for comparing the phase of the current flowing in the antenna circuit with the voltage which feeds the amplifier 111 to produce a control voltage which is in turn used to vary a variable reactance in such direction as to shift the reactance of the antenna circuit in a direction to restore the original desired phase relation. Accordingly I connect a primary winding 135 of a potential transformer 136 between the transmission line conductor 108 and ground. The transformer 136 includes a secondary 137 which may be tuned to the transmission frequency as by means of a condenser 138. The voltage produced across the winding 137 is amplified by a conventional amplifier circuit including a vacuum tube 139 and applied across the primary winding of a coupling transformer 140.

The transformer 140 includes a center tapped secondary winding 141, the end connections of which are, respectively, connected by conductors 142 and 143 to the anodes of a pair of rectifiers 144 and 145. The cathode of the rectifier 144 is connected by means of a conductor 146 to a load resistance 147 and, similarly, the cathode of the rectifier 145 is connected as by means of a conductor 148 to a load resistance 149.

The load resistances 147 and 149 are connected together and their point of common connection is returned to the center tap of the transformer winding 141 by means of conductors 150 and 151. Conductors 150 and 151 connect, respectively, to output terminals 152 and 153 of a phase shifting device 154. The phase shifting device 154 includes also input terminals 155 and 156 connected, respectively, by conductors 157 and 158 to a secondary winding 159 of the previously mentioned current transformer 106.

The phase shifting device 154 comprises an adjustable mechanism operating to produce across the output terminals 152 and 153 a voltage which is equal to or at least proportional to the voltage which is applied to the input terminals 155 and 156 thereof and permitting the time phase of the output voltage to be adjusted relative to the time phase of the input voltage.

It will, therefore, be noted that the rectifier 144 is included in a closed circuit in series relationship with the upper half of the transformer winding 141, the phase shifter 154 and the current transformer winding 159 and the load resistance 147. Similarly, the rectifier 145 is included in a closed circuit in series relationship with the lower half of the transformer winding 141, the phase shifting device 154 and the current transformer secondary winding 159 and the load resistance 149.

The phase shifting device is normally adjusted to introduce into the two rectifier circuits between the center tap of the winding 141 and the common connection between the resistances 147 and 149 a voltage which is proportional to the current flowing in the antenna 100 and which bears a phase quadrature relation to the voltage induced across the winding 141. Also the resistances 147 and 149 are preferably made equal so that the direct potential produced across these resistances by the rectification of the radio frequency voltage applied to the rectifiers 144 and 145 will be equal.

Since the current flows through the resistances 147 and 149 in opposite directions, the conductor 146 will normally be at the same potential as the conductor 148. Should a shift in phase occur as above noted, the voltage applied to one of the rectifiers would shift in one direction, whereas, the voltage applied to the other rectifier would shift in the opposite direction so that the voltages produced across the resistances 147 and 149 would no longer be equal, thereby producing a voltage between the conductors 146 and 148.

The conductor 148 is preferably grounded as indicated at 160 and the conductor 146 is preferably connected as by means of a conductor 161 through resistances 162 and 163 to the grid of a vacuum tube 164.

Undesired radio frequency may be filtered out of the above described control circuit by connecting by-pass condensers 165 and 166 in parallel, respectively, with the resistances 147 and 149 and by also connecting the point of common connection between the resistances 162 and 163 to ground through a by-pass condenser 167.

The cathode of the tube 164 is connected to ground through a cathode bias resistance 168 which is preferably shunted with a by-pass condenser 169. The plate of the tube 164 is preferably connected to the plate of the previously mentioned amplifier tube 111 by means of a conductor 170 and is also connected to the grid of the tube 164 through a coupling condenser 171.

Whenever the desired phase relationship exists between the antenna current and the voltage delivered by the transmission line 107, the conductor 161 will be at ground potential as above noted and the grid bias applied to the tube 164 will be that which is developed by the cathode bias resistance 168. If this phase relation shifts from the desired relation, then the conductor 161 will have applied thereto a direct potential, the polarity of which with respect to ground is indicative of the direction in which the phase shift has taken place and the magnitude of which is proportional to that phase shift. This will serve to increase or decrease the negative grid bias applied to the tube 164 and will consequently correspondingly vary the mutual conductance of the tube.

The plate circuit for the tube 164 includes the conductor 170, the cathode of the tube and the by-pass condenser 169 so that radio frequency current is caused to flow through this plate circuit and the tube, therefore, comprises an impedance which may be considered to be connected in parallel with the primary of the input coupling transformer 113 and the power amplifier 103. This impedance varies with the variations in grid bias of the tube 164.

The impedance provided by the plate circuit of the tube 164 comprises an inductive reactance since the radio frequency voltage which is applied to the grid of the tube 164 is derived from the conductor 170 and passed through the condenser 171 with the result that the radio frequency grid voltage of the tube 164 bears a phase quadrature relation to the voltage which is applied to the plate through the conductor 170.

Since the current drawn by the plate of the tube 164 must vary in accordance with the variations in the grid voltage of the tube, it will be seen that the radio frequency current which flows from the plate to the cathode of the tube 164 will be in phase quadrature relation to the radio frequency voltage existing between the plate and the cathode of the tube. Thus changing the amplification of the tube 164 produces a result equivalent to changing the inductance or the capacitance of the tuned circuit comprising the primary of the coupling transformer 113. This will, of course, produce a phase shift and the various instrumentalities hereinbefore described are so arranged that the phase shift thus produced is in a direction to compensate for the phase shift in the antenna current which resulted in the changing of the reactance comprising the plate circuit of the tube 164.

It will thus be seen that the control mechanism referred to generally by the reference character 134 operates to maintain a fixed phase relation between the current actually flowing in the antenna 100 and the exciting voltage delivered by the radio frequency transmission line 107.

As before noted, the regulating equipment indicated generally by the reference character 116 operates to maintain the current flowing in the antenna at a constant value. Thus the antenna circuit must exhibit a constant resistance and reactance characteristic so that the time phase of the radio frequency potentials radiated into space must remain constant irrespective of physical or extraneous electrical changes tending to cause a shift in phase of such radiated energy.

I have illustrated diagrammatically in Fig. 3 an arrangement whereby the required phase relationship between two separate signals emanating from a pair of radio beacon transmitting antennae may be so maintained as to cause the radio beacon course defined by the operation of the system to remain in a fixed compass direction irrespective of external changes ordinarily tending to cause a shift in the compass direction of the defined course.

As is illustrated in Fig. 3 a pair of radio frequency transmitting antennae A and B are spaced apart a predetermined distance and the signals emanating from the antennae A and B are so synchronized and phased with each other as to define at least one radio beacon course identified by the solid line 200 in Fig. 3. As previously noted, the course 200 may comprise an equisignal course defined by a conventional equisignal radio beacon system or a system operating in accordance with the disclosure contained in my previously filed copending application Serial No. 432,948, filed March 2, 1942, now Patent No. 2,406,396, granted August 27, 1946. On the other hand, the course 200 may comprise an equiphase difference course such as is defined by the new type of radio beacon system disclosed in my previously filed copending application Serial No. 420,059, filed November 22, 1941, now abandoned.

In either event I employ a radio receiving apparatus R of a type adapted to properly cooperate with the type of radio beacon transmission which is emanated from the antennae A and B. The receiver R is positioned at a point 201 such that a line 202 drawn from the point 201 through the center or origin 203 of the field pattern produced by the radio beacon system will comprise an extension of the course 200 or, in other words, will lie in the same compass direction as the desired and intended direction of the course 200. The receiver R is coupled to control the operation of the antennae A and B in such manner as to maintain the defined course 200 extended in the desired compass direction.

I have illustrated in Fig. 4 the arrangement which may be employed when the system illustrated in Fig. 3 comprises an equi-signal system. As is shown in Fig. 4 the antennae A and B are each energized from suitable power amplifiers represented by the rectangles bearing the reference characters 204 and 205. These amplifiers may be of any suitable conventional construction and may also include such frequency doubling stages as may be desired to produce the desired ultimate frequency of radiation.

The amplifiers 204 and 205 are each arranged to be excited by radio frequency energy developed in a suitable oscillator or signal source represented by the rectangle bearing the reference character 206. The source 206 may be positioned geographically as desired and the energy may be conveyed from the source 206 to the amplifiers 204 and 205 through suitable radio frequency transmission systems 207 and 208 illustrated diagrammatically in Fig. 4 as comprising coaxial cables of conventional construction.

The outlying end of the cable 207 is preferably coupled directly to the input of the amplifier 204 as by means of a coupling resistance 209. The outlying end of the cable 208 is, however, connected to a conductor 210 which is in turn connected to ground through two parallel circuits, one of which includes a potentiometer 211 and a fixed inductance 212 connected in series relationship with each other and the other of which includes a potentiometer 213 and a fixed capacitance 214 also connected in series relationship with each other.

The movable arms of the potentiometers 211 and 213 are connected, respectively, by conductors 215 and 216 to opposite contacts 217 and 218 of a single pole double-throw switch. This switch includes a movable switch arm 219 which is connected as by means of a conductor 220 to the input of the amplifier 205 and to ground through a coupling resistance 221. The switch arm 219 may be operated in any suitable manner. I have, however, in Fig. 4 illustrated the switch arm 219 as comprising the movable element of a control relay which includes also an actuating coil 222. The coil 222 is connected in a series circuit with a suitable source of power such as a battery 223 and a control switch 224.

For the purpose of making the system fully automatic in its operation the switch 224 is arranged to be controlled automatically as by means of a rotating cam member 225 arranged to be driven at a substantially fixed speed as by means of a clockwork 226 or other suitable driving element. When the control switch 224 is closed, the movable switch arm 219 will engage one of the contacts 217 or 218 and when the control switch 224 is open, the movable switch arm 219 will engage the other of the contacts 217 or 218.

The shape of the cam 225 may be adjusted to provide for any desired relationship between the duration of the periods in which the switch arm 219 engages the switch contacts 217 and 218, respectively. It will be noted that when the switch arm 219 is in the position shown engaging the switch contact 217, the time phase of the signal applied to the input of the amplifier 205 will be different from the time phase of the signal which is applied to the input of the amplifier when the switch arm 219 is in its alternative position engaging the switch contact 218. The magnitude of this phase difference may be adjusted as desired in accordance with the requirements of the particular equi-signal transmission system employed by appropriately positioning the movable arm portions of the potentiometers 211 and 213 along the resistance strip of such potentiometers.

The resistances 209 and the coupling circuits connected to the conductor 210 are each preferably made equal to the surge impedance of the transmission lines 207 and 208. The input circuit for the transmission lines 207 and 208 comprise resistances 227 and 228 connected in shunt across the transmission lines between the central conductors 229 and 230 thereof and the outer grounded sheaths 231 and 232 thereof.

The signal source 206 is coupled to the transmission lines 207 and 208 as by extending one supply conductor 233 into connection with the sheaths 231 and 232 and by extending the other supply conductor 234 to the center conductors 229 and 230 through a pair of identical tank circuits 235 and 236 each including an inductance 237 and a shunt connected condenser 238.

I employ also a phase shifting condenser of the split stator variable type, the movable element 239 thereof being connected to the conductor 234 while one of the stator portions 240 is connected to the conductor 229 and the other stator portion 241 is connected to the conductor 230. Thus when the movable element 239 occupies an intermediate or central position, the tuning of the tank circuits 235 and 236 will be identical so that the voltage developed across the resistances 227 and 228 and applied to the input of the transmission lines 207 and 208 will be in phase with each other. Movement of the movable element 239 will, however, detune the tank circuit 235 in a direction opposite to the detuning of the tank circuit 236 with the result that the input voltage developed across the resistance 237 will shift in one direction, whereas, the voltage developed across the input resistance 228 will shift in the opposite direction. Thus, by properly positioning the movable element 239, it is possible to realize any desired phase relation between the two radio frequency signals emanating, respectively, from the antennae A and B.

I have arranged the apparatus in such manner that the movable element 239 may be automatically so positioned as to provide a phase relationship between the signals emanated from the antennae A and B which will extend the radio beacon course defined thereby in the desired compass direction. Accordingly I connect the movable element 239 to a mechanism for moving the same illustrated in Fig. 4 as comprising a reversible electric motor 242. The motor 242 may be of any suitable reversible type but the one which is illustrated in Fig. 4 comprises a split series field type including split series field windings 243 and 244 so arranged that when the motor is energized by power supplied through one of the fields, the direction of rotation will be opposite to that resulting from the application of power through the other field.

One terminal of the motor 242 may be connected to a suitable source of power illustrated in Fig. 4 as comprising a battery 245, the other terminal of which may be connected to ground as at 246. The free end terminal of each of the field windings 243 and 244 is extended by means of control conductors 247 and 248 to left and right contacts 249 and 250, respectively, of a control switch including a balanced switch arm 251 which is in turn connected to ground as by means of a conductor 252.

The control switch 251 is preferably located adjacent the location of the receiver R at the point 201. For an equi-signal system such as is illustrated in Fig. 4 the receiver R includes a conventional radio receiving apparatus indicated generally by the rectangle bearing the reference character 253, the output of which is coupled as by means of conductors 254 to suitable rectifying and amplifying equipment indicated generally by the rectangle bearing the reference character 255. The output of the rectifying equipment 255 is connected by means of conductors 256 to the coils 257 of a suitable voltage responsive mechanism such as the movement of a conventional galvanometer.

This mechanism includes a movable element 258 which is coupled to the movable switch member 251 and is so arranged that the member 251 will occupy an intermediate position not engaging either contact 249 or 250 when there is no voltage applied to the coils 257.

The movement described constitutes a zero center arrangement such that when a voltage of one polarity is applied to the coils 257 the movable element 251 will be moved into engagement with the contact 249, whereas, if a voltage of opposite polarity is applied to the coils 257 the movable element 251 will be moved in the opposite direction into engagement with the contact 250.

The rectifying and amplifying equipment indicated generally at 255 is so arranged that the voltage across the conductors 256 is zero when the receiver R is positioned along the course defined by the operation of the antennae A and B. This equipment operates to produce across the conductors 256 a voltage of one polarity when the receiver R is positioned to the left of the course defined by the operation of the radio beacon system and a voltage of opposite polarity when the receiver R is positioned to the right of the defined course.

For a more detailed description of the construction of the mechanism indicated by the rectangle 255 reference may be had to my copending application Serial No. 424,159, filed December 23, 1941, wherein I have illustrated, described and claimed two different types of mechanisms which may be employed for this purpose. Also reference may be had to my copending application Serial No. 432,948, filed March 2, 1942, now Patent No. 2,404,810, granted July 30, 1946, wherein I have illustrated, described and claimed a third form of apparatus which may be used for this purpose.

From the foregoing it will be noted that when the receiver R is positioned along the line 202 and the antennae A and B are so excited as to define an equi-signal course extending along the line 202, the movable control element 251 will occupy an intermediate position and the control motor 242 will be de-energized.

In the event some change in conditions occurs such as a change in temperature serving to change the actual length of one of the antennae, the resulting phase shift of the signal emanated from the other will cause the equi-signal course defined by the operation of the system to swing to one side or the other of the line 202 in Fig. 3. This will serve then to position the receiver R to one side of the defined course with the result that a voltage will be applied to the coils 257, the movable element 251 will be moved into engagement with one of the contacts 249 or 250 and the motor 242 will be energized. This will move the movable condenser 239 and shift the phase of the signals emanating from the antennae A and B with respect to each other and the mechanism is so arranged that the direction of this phase shift will be in a direction opposite to that caused by the changing extraneous conditions, with the result that the course defined by the operation of the system is shifted back toward its original position, and when the reshifted position of the defined course coincides with the lines 200 and 202, the voltage developed across the coils 257 will be restored to zero and the motor 242 will be de-energized.

Thus it will be seen that the control receiver R coacts with the motorized phase shifting equipment to maintain the course defined by the operation of the radio beacon system extended at a desired compass direction irrespective of disturbing influences or extraneous conditions tending to cause a shift of the defined course to a different compass direction.

I have illustrated in Fig. 5 an arrangement similar to that described above in connection with Fig. 4 but adapted particularly for use with an equi-phase difference type of radio beacon system such as that described in my copending application Serial No. 420,059, filed November 22, 1941.

It will be noted by having reference to Figs. 4 and 5 that the transmitting equipment illustrated in Fig. 5 is identical with that illustrated in Fig. 4 with the exception that the keying arrangement illustrated in Fig. 4 and required for equi-signal type of operation is omitted from the equipment illustrated in Fig. 5. It will be understood, of course, that in Fig. 5 the frequency multiplying stages employed in the power amplifiers 204 and 205 are different in number so that the signal emanated from the antenna A is different from that which is emanated from the antenna B but bearing a harmonic relation thereto.

The system illustrated in Fig. 5 also differs from that which is illustrated in Fig. 4 as regards the receiving apparatus employed. In Fig. 5 the rectangle 253 is intended to represent a double channel radio receiver including two separate receiving channels, one tuned to the frequency emanated from the antenna A and the other tuned to the frequency emanated from the antenna B. Similarly, the equipment included within the rectangle 255 differs from that illustrated in Fig. 4 in that it comprises a phase discriminating apparatus operating to produce across the conductors 256 zero voltage when the phase relation between the signals received from antennae A and B bear a predetermined multiple phase relation to each other and operating to produce a voltage across the conductors 256 whenever the phase relation departs from this predetermined phase relation.

The equipment is so arranged that the polarity of the voltage developed across the conductors 256 is directly indicative of the direction of phase shift. While any known type of phase discriminating apparatus capable of producing this type of operation may be employed, preference is expressed for the apparatus which I have illustrated, described and claimed in my copending application Serial No. 420,059.

Thus the equipment which is illustrated in Fig. 5 operates in the same manner as that previously described in Fig. 4; a change in compass direction of the course resulting in the application of a correction to the transmitting equipment so as to shift the phase of the antenna A with respect to antenna B in such direction as to cause the course defined by the operation of the system to shift back to its original and intended direction.

From the foregoing it will be observed that I have provided a novel apparatus for maintaining the course which is defined by a radio beacon system extended in the desired compass direction. In other words, the apparatus of my invention operates automatically to eliminate the wavering or shifting of the defined course which now characterizes the radio beacon course-defining systems in present day use.

It will also be noted that I have provided for accomplishing this result in a number of ways. In Figs. 1 and 2 I have disclosed apparatus which operates to accomplish this result by so regulating the operation of the radio beacon transmitting antennae as to maintain a fixed phase relation between the signals emanated from such antennae.

Figs. 4 and 5 represent a somewhat different approach to the problem wherein the phase relation between the two sets of signals emanated from the beacon transmitting antennae is so controlled as to directly maintain the defined course extended in the desired compass direction irrespective of what the actual phase relation between the antennae may be.

Experiments have indicated that the use of apparatus of the character above described will result in reducing the undesired shifting of the radio beacon course to as little as from two percent to ten percent of the shift now encountered.

While I have shown and described the preferred embodiment of my invention, I do not desire to be limited to any of the details of construction shown or described herein, except as defined in the appended claims.

I claim:

1. In a radio frequency transmitting apparatus, the combination of: a source of radio frequency energy; a transmitting antenna having transmission resistance and reactance; a circuit coupling said antenna to said source; and a device for compensating for changes in said transmission resistance and reactance comprising a variable resistance in said circuit, actuating means operable to vary said resistance, control means responsive to changes in magnitude of antenna current, means coupling said control means to said actuating means for varying said resistance in accordance with changes in magnitude of said antenna current, a variable reactance in said circuit, another actuating means operable to vary said reactance, another control means responsive to changes in phase of antenna current with respect to voltage of said circuit, and means coupling said other control means to said other actuating means for varying said reactance in accordance with changes in said phase.

2. In a radio frequency transmitting apparatus, the combination of: a source of radio frequency energy; a transmitting antenna having a transmission resistance; a circuit coupling said antenna to said source; and a device for compensating for changes in said transmission resistance comprising a variable series resistance in said circuit, actuating means operable to vary said resistance, control means responsive to changes in magnitude of antenna current, and means coupling said control means to said actuating means for varying said resistance in accordance with said changes in magnitude of said antenna current.

3. In a radio frequency transmitting apparatus, the combination of: a source of radio frequency energy; a transmitting antenna having transmission resistance and reactance; a circuit coupling said antenna to said source; and a device for compensating for changes in said transmission resistance and reactance comprising a variable reactance in said circuit, actuating means operable to vary said reactance, control means responsive to changes in phase of antenna current with respect to voltage of said circuit, means coupling said control means to said actuating means for varying said reactance in accordance with changes in said phase, and regulating means for holding substantially constant the current flowing in said antenna.

4. In a radio frequency transmitting apparatus, the combination of: a source of radio frequency energy; a transmitting antenna having transmission resistance; a circuit coupling said antenna to said source; and a device for compensating for changes in said transmission resistance comprising a variable resistance in said circuit, actuating means operable to vary said resistance, measuring means coupled to said antenna for producing a potential proportional to the magnitude of the current flowing in said antenna, another measuring means coupled to said antenna for producing another potential proportional to the magnitude of the voltage of said circuit, means for comparing said other potential with said first-mentioned potential to provide a control potential proportional to the difference between said other potential and said first-mentioned potential, and control means responsive to changes in said control potential for operating said actuating means.

5. The method of compensating a circuit including a variable reactance and interconnecting an antenna having transmission resistance and reactance with a source of radio frequency energy to correct for changes in said transmission resistance and reactance which consists in holding the current in said antenna substantially constant, and employing variations in phase relations between the voltage of said circuit and said current to vary said variable reactance.

6. The method of compensating a circuit including a variable series resistance and a variable reactance and interconnecting an antenna having transmission resistance and reactance with a source of radio frequency energy to correct for changes in said transmission resistance and reactance which consists in employing variations in voltage of said circuit and variations of antenna current to vary said series resistance, and employing variations in phase relation between said current and said voltage to vary said reactance.

7. The method of compensating a circuit including a variable series resistance and interconnecting an antenna having transmission resistance with a source of radio frequency energy to correct for changes in said transmission resistance which includes the step of employing variations in antenna current to vary said series resistance.

WILLIAM J. O'BRIEN.

REFERENCES CITED

The following references are of record in the file of this patent:

UNITED STATES PATENTS

| Number | Name | Date |
| --- | --- | --- |
| 1,395,987 | Round | Nov. 1, 1921 |
| 1,530,169 | Grimes | Mar. 17, 1925 |
| 1,626,449 | Brown | Apr. 26, 1927 |
| 1,626,724 | Demarest et al. | May 3, 1927 |
| 1,843,288 | Leonard, Jr. | Feb. 2, 1932 |
| 1,907,965 | Hansell | May 9, 1933 |
| 2,085,125 | Shaw | June 29, 1937 |
| 2,139,060 | Kear | Dec. 6, 1938 |
| 2,140,492 | Black | Dec. 20, 1938 |
| 2,172,832 | Caruthers | Sept. 12, 1939 |
| 2,176,587 | Goldstine (2) | Oct. 17, 1939 |
| 2,191,454 | Craft | Feb. 27, 1940 |
| 2,190,037 | Neufeld | Feb. 13, 1940 |
| 2,196,590 | Koch | Apr. 9, 1940 |
| 2,284,612 | Green et al. | May 26, 1942 |
| 2,297,931 | White | Oct. 6, 1942 |
| 2,298,930 | Decino | Oct. 13, 1942 |
| 2,304,377 | Van B. Roberts | Dec. 8, 1942 |
| 2,306,052 | Goldstine (3) | Dec. 22, 1942 |
| 2,345,101 | Crosby | Mar. 28, 1944 |
| 2,358,454 | Goldstine (1) | Sept. 19, 1944 |

FOREIGN PATENTS

| Number | Country | Date |
| --- | --- | --- |
| 438,809 | Great Britain | Nov. 25, 1935 |